(12) United States Patent
Jung et al.

(10) Patent No.: US 11,823,402 B2
(45) Date of Patent: Nov. 21, 2023

(54) METHOD AND APPARATUS FOR CORRECTING ERROR IN DEPTH INFORMATION ESTIMATED FROM 2D IMAGE

(71) Applicants: Electronics and Telecommunications Research Institute, Daejeon (KR); The Trustees of Indiana University, Indianapolis, IN (US)

(72) Inventors: Soon Heung Jung, Daejeon (KR); Jeongil Seo, Daejeon (KR); Jagpreet Singh Chawla, Indianapolis, IN (US); Nikhil Thakurdesai, Indianapolis, IN (US); David Crandall, Indianapolis, IN (US); Md Reza, Indianapolis, IN (US); Anuj Godase, Indianapolis, IN (US)

(73) Assignees: Electronics and Telecommunications Research Institute, Daejeon (KR); The Trustees of Indiana University, Indianapolis, IN (US)

( * ) Notice: Subject to any disclaimer, the term of this patent is extended or adjusted under 35 U.S.C. 154(b) by 191 days.

(21) Appl. No.: 17/306,429

(22) Filed: May 3, 2021

(65) Prior Publication Data
US 2022/0351397 A1    Nov. 3, 2022

(51) Int. Cl.
*G06K 9/00*    (2022.01)
*G06T 7/50*    (2017.01)
*G06T 7/00*    (2017.01)

(52) U.S. Cl.
CPC .............. *G06T 7/50* (2017.01); *G06T 7/0002* (2013.01); *G06T 2207/10024* (2013.01);
(Continued)

(58) Field of Classification Search
CPC ..................... G06T 7/50; G06T 7/0002; G06T 2207/10024; G06T 2207/10028; G06T 2207/20081; G06T 2207/30168
(Continued)

(56) References Cited

U.S. PATENT DOCUMENTS

| 10,043,285 B2 | 8/2018 | Kim |
| 2017/0032222 A1* | 2/2017 | Sharma ................ G06V 30/194 |

(Continued)

FOREIGN PATENT DOCUMENTS

| JP | 2020155116 A | 9/2020 |
| KR | 1020130092157 A | 8/2013 |

(Continued)

OTHER PUBLICATIONS

Pilzer, Andrea, et al. "Refine and distill: Exploiting cycle-inconsistency and knowledge distillation for unsupervised monocular depth estimation." Proceedings of the IEEE/CVF Conference on Computer Vision and Pattern Recognition. 2019. (Year: 2019).*

(Continued)

*Primary Examiner* — Jonathan S Lee
(74) *Attorney, Agent, or Firm* — William Park & Associates Ltd.

(57) ABSTRACT

A method and apparatus for correcting an error in depth information estimated from a two-dimensional (2D) image are disclosed. The method includes diagnosing an error in depth information by inputting a color image and depth information estimated using the color image to a depth error detection network, and determining enhanced depth information by maintaining or correcting the depth information based on the diagnosed error.

14 Claims, 7 Drawing Sheets

(52) U.S. Cl.
CPC ............... *G06T 2207/10028* (2013.01); *G06T 2207/20081* (2013.01); *G06T 2207/30168* (2013.01)

(58) Field of Classification Search
USPC ........................................................ 382/154
See application file for complete search history.

(56) References Cited

U.S. PATENT DOCUMENTS

| | | | |
|---|---|---|---|
| 2018/0322611 | A1 | 11/2018 | Bang et al. |
| 2020/0226777 | A1 | 7/2020 | Luo et al. |

FOREIGN PATENT DOCUMENTS

| | | |
|---|---|---|
| KR | 1020140064090 A | 5/2014 |
| KR | 1020140066872 A | 6/2014 |

OTHER PUBLICATIONS

Gupta, Saurabh, Judy Hoffman, and Jitendra Malik. "Cross modal distillation for supervision transfer." Proceedings of the IEEE conference on computer vision and pattern recognition. 2016. (Year: 2016).*

Koch, Tobias, et al. "Evaluation of cnn-based single-image depth estimation methods." Proceedings of the European Conference on Computer Vision (ECCV) Workshops. 2018. (Year: 2018).*

Huynh, Lam, et al. "Guiding monocular depth estimation using depth-attention volume." Computer Vision-ECCV 2020: 16th European Conference, Glasgow, UK, Aug. 23-28, 2020, Proceedings, Part XXVI 16. Springer International Publishing, 2020. (Year: 2020).*

Swami, Kunal, Prasanna Vishnu Bondada, and Pankaj Kumar Bajpai. "Aced: Accurate and edge-consistent monocular depth estimation." 2020 IEEE International Conference on Image Processing (ICIP). IEEE, 2020. (Year: 2020).*

Zhou, Huizhong, Benjamin Ummenhofer, and Thomas Brox. "Deeptam: Deep tracking and mapping." Proceedings of the European conference on computer vision (ECCV). 2018. (Year: 2018).*

Hamid Hekmatian et al., Conf-Net: Toward High-Confidence Dense 3D Point-Cloud with Error-Map Prediction, arXiv:1907.10148, Sep. 19, 2019.

Jagpreet Chawla et al., Error Diagnosis of Deep Monocular Depth Estimation Models, ICRA 2021 Conference, May 30, 2021.

Gupta, S., Hoffman, J., & Malik, J. (2016). "Cross modal distillation for supervision transfer." Proceedings of the IEEE conference on computer vision and pattern recognition.

Pilzer, A., et al. (2019). "Refine and distill: Exploiting cycle-inconsistency and knowledge distillation for unsupervised monocular depth estimation." Proceedings of the IEEE/CVF Conference on Computer Vision and Pattern Recognition.

Swami, K., Bondada, P. V., & Bajpai, P. K. (2020). "Aced: Accurate and edge-consistent monocular depth estimation." 2020 IEEE International Conference on Image Processing (ICIP). IEEE.

* cited by examiner

METHOD AND APPARATUS FOR CORRECTING ERROR IN DEPTH INFORMATION ESTIMATED FROM 2D IMAGE

BACKGROUND

1. Field

One or more example embodiments relate to a method and apparatus for correcting an error in depth information, and more particularly, to a method and apparatus for correcting an error in depth information estimated using a single image or a plurality of images.

2. Description of Related Art

There has been ongoing research on technologies for reconstructing a three-dimensional (3D) image based on a two-dimensional (2D) image in a computer vision field.

Recently developed is a technology for estimating depth information for reconstructing a 3D image from a 2D image using machine learning.

However, completely restoring an information loss occurring in a process of capturing a real 3D object and converting it to a 2D image may not be readily performed, and thus there may inevitably be an error in estimated depth information.

Thus, there is a desire for a method that may minimize an error in estimated depth information to improve the quality of a reconstructed 3D image.

SUMMARY

An aspect provides a method and apparatus that may diagnose an error in estimated depth information using a depth error detection network and correct the depth information based on a result of the diagnosing, thereby improving the accuracy of the estimated depth information.

Another aspect also provides a method and apparatus that may repeat a process of correcting depth information, diagnosing again an error in the depth information based on the corrected depth information and a color image, and correcting the depth information based on the diagnosed error, thereby improving the accuracy of the depth information.

According to an example embodiment, there is provided a method of correcting an error in depth information, the method including diagnosing an error in depth information by inputting depth information estimated using a color image and the color image to a depth error detection network, and determining enhanced depth information by maintaining or correcting the depth information based on the diagnosed error.

The depth error detection network may receive, as an input, the depth information or the enhanced depth information, and the color image, and output, as a result of diagnosing the error in the depth information, one of over-estimated depth information, under-estimated depth information, and correctly estimated depth information corresponding to an actual depth, for each pixel of the color image.

When the output of the depth error detection network corresponds to the over-estimated depth information, the determining of the enhanced depth information may include determining the enhanced depth information by correcting the depth information through under-estimation.

When the output of the depth error detection network corresponds to the under-estimated depth information, the determining of the enhanced depth information may include determining the enhanced depth information by correcting the depth information through over-estimation.

The diagnosing may include diagnosing an error in the enhanced depth information using the enhanced depth information and the color image, after the enhanced depth information is determined.

The depth error detection network may include a first encoder configured to encode the depth information and output a feature of the depth information, a second encoder configured to encode the color image and output a feature of the color image, and a decoder configured to output a result of diagnosing the error in the depth information for each pixel of the color image based on the feature of the color image and the feature of the depth information.

The first encoder may be trained using cross modal distillation for a supervision transfer to output the feature of the depth information having a format corresponding to a format of the feature of the color image.

The decoder may repeat a process of concatenating the feature of the color image and the feature of the depth information and performing a convolution, concatenating information obtained through the convolution and information decoded in a previous step, and processing the concatenated information, and perform a convolution having a sigmoid activation in a final step, to output the result of diagnosing the error in the depth information.

The processing of the concatenated information may include performing upsampling by interpolating the concatenated information, performing a convolution on the upsampled information, and performing batch normalization on information obtained through the convolution.

The depth error detection network may be trained using a loss function that includes a total number of pixels included in the color image, a probability of each of the pixels belonging to each class of the result of diagnosing the error in the depth information based on the output of the depth error detection network, and a probability of each of the pixels belonging to each class of the result of diagnosing the error in the depth information based on ground truth information.

According to another example embodiment, there is provided an apparatus for correcting an error in depth information, the apparatus including a processor configured to diagnose an error in depth information by inputting depth information estimated using a color image and the color image to a depth error detection network, and determine enhanced depth information by maintaining or correcting the depth information based on the diagnosed error.

The processor may diagnose an error in the enhanced depth information using the enhanced depth information and the color image, after the enhanced depth information is determined.

The depth error detection network may include a first encoder configured to encode the depth information and output a feature of the depth information, a second encoder configured to encode the color image and output a feature of the color image, and a decoder configured to output a result of diagnosing the error in the depth information for each pixel of the color image based on the feature of the color image and the feature of the depth information.

The first encoder may be trained using cross modal distillation for a supervision transfer to output the feature of the depth information having a format corresponding to a format of the feature of the color image.

The decoder may repeat a process of concatenating the feature of the color image and the feature of the depth information and performing a convolution, concatenating information obtained through the convolution with information decoded in a previous step, and processing the concatenated information, and perform a convolution having a sigmoid activation in a final step to output the result of diagnosing the error in the depth information.

The processing of the concatenated information may include performing upsampling by interpolating the concatenated information, performing a convolution on the upsampled information, and performing batch normalization on information obtained through the convolution.

The depth error detection network may be trained using a loss function that includes a total number of pixels included in the color image, a probability of each of the pixels belonging to each class of the result of diagnosing the error in the depth information based on the output of the depth error detection network, and a probability of each of the pixels belonging to each class of the result of diagnosing the error in the depth information based on ground truth information.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the present disclosure will become apparent and more readily appreciated from the following description of example embodiments, taken in conjunction with the accompanying drawings of which.

DETAILED DESCRIPTION

Figure 1:
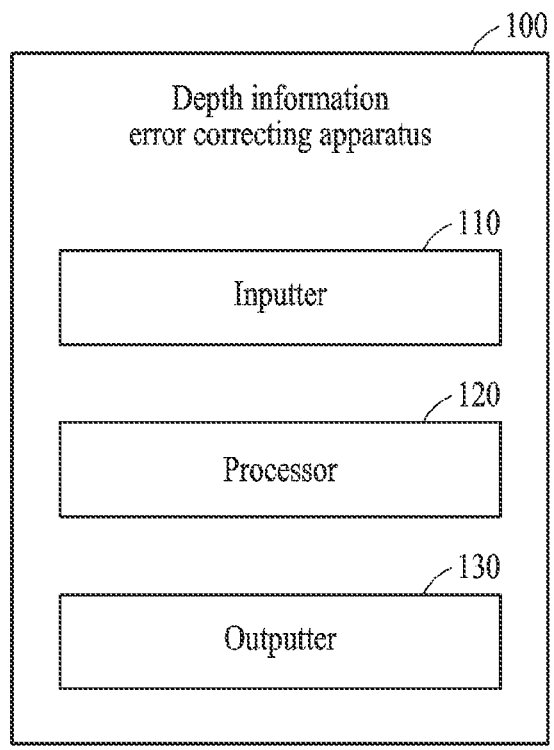
FIG. 1 is a diagram illustrating an example of an apparatus for correcting an error in depth information according to an example embodiment.

Hereinafter, some examples will be described in detail with reference to the accompanying drawings. However, various alterations and modifications may be made to the examples. Here, the examples are not construed as limited to the disclosure and should be understood to include all changes, equivalents, and replacements within the idea and the technical scope of the disclosure.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Hereinafter, example embodiments will be described in detail with reference to the accompanying drawings.

FIG. 1 is a diagram illustrating an example of an apparatus for correcting an error in depth information according to an example embodiment. Hereinafter, an apparatus for correcting an error in depth information will be simply referred to as a depth information error correcting apparatus.

Referring to FIG. 1, a depth information error correcting apparatus 100 includes an inputter 110, a processor 120, and an outputter 130.

The inputter 110 may be a communicator configured to receive at least one of a color image or estimated depth information from outside, or a communication interface connected to a storage medium and configured to download at least one of a color image stored in the storage medium or estimated depth information.

The processor 120 may execute a depth error detection network and a corrector to correct an error in depth information. Detailed configurations and operations of the depth error detection network and the corrector will be described hereinafter with reference to FIG. 2. In addition, the processor 120 may estimate the depth information from the color image input through the inputter 110.

In detail, the processor 120 may diagnose an error in depth information by inputting a color image and depth information estimated using the color image to the depth error detection network. The processor 120 may then maintain or correct the depth information based on a result of diagnosing the error to determine enhanced depth information. After the enhanced depth information is determined, the processor 120 may repeat a process of diagnosing an error in the enhanced depth information using the enhanced depth information and the color image and correcting the depth information based on the diagnosed error, thereby improving the accuracy of the depth information.

The outputter 130 may output, to a display, the depth information in which the error is corrected by the processor 120, for example, the enhanced depth information, or transmit such depth information to another terminal.

Figure 2:
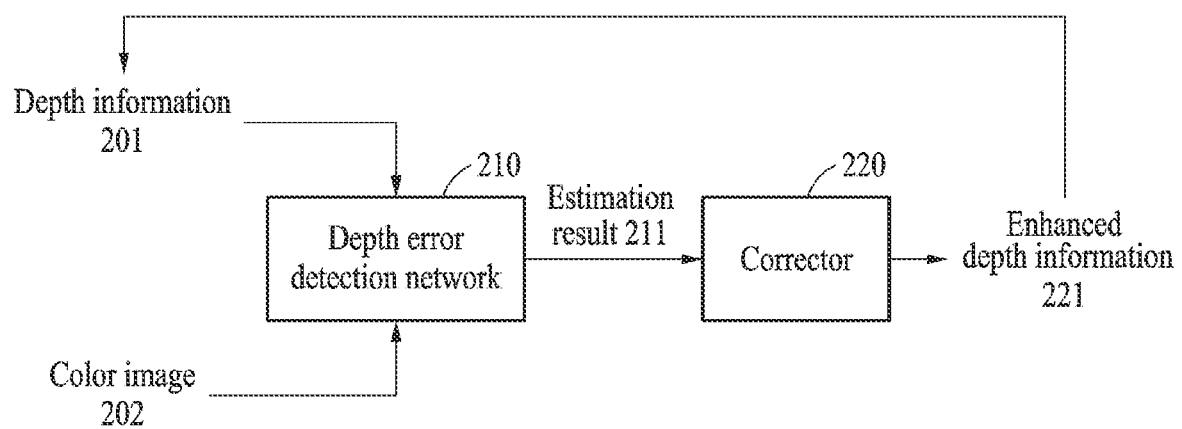
FIG. 2 is a diagram illustrating an example of correcting an error in depth information according to an example embodiment.

FIG. 2 is a diagram illustrating an example of correcting an error in depth information according to an example embodiment.

Referring to FIG. 2, a depth error detection network 210 may receive a color image 202 and depth information 201 estimated using the color image 202. Depth information described herein may refer to information input through the inputter 110 or information estimated by the processor 120 using the color image 202.

The depth error detection network 210 may output, as a result of diagnosing an error in depth information, an estimation result 211 that is obtained as one of "over-estimated (depth information)," "under-estimated (depth information)," and "correctly estimated (depth information) corresponding to an actual depth," for each pixel of the color image 202 based on the input information. The result indicating the "correctly estimated depth information corresponding to the actual depth" may be from a diagnosis in a case in which a difference between actual depth information and estimated depth information is less than or equal to a threshold value.

When the output of the depth error detection network 210 corresponds to the "over-estimated depth information," a corrector 220 may correct the depth information 201 through under-estimation to determine enhanced depth information 221.

When the output of the depth error detection network 210 corresponds to the "under-estimated depth information," the corrector 220 may correct the depth information 201 through over-estimation to determine the enhanced depth information 221.

When the output of the depth error detection network 210 corresponds to the "correctly estimated depth information corresponding to an actual depth," the corrector 220 may determine the depth information to be the enhanced depth information 221 without a correction.

In addition, there may be a difference between the enhanced depth information 221 and actual depth information. For example, although the output of the depth error detection network 210 is the over-estimated depth information, the enhanced depth information 221 obtained through the corrector 220 may be under-estimated one than the actual depth information. Thus, after the enhanced depth information 221 is determined as illustrated in FIG. 2, the processor 120 may input, to the depth error detection network 210, the enhanced depth information 221 in substitution for the depth information 201 and improve the accuracy of the enhanced depth information 221.

Here, when the output of the depth error detection network 210 corresponds to the correctly estimated depth information corresponding to an actual depth for all pixels in the color image 202, or when the enhanced depth information 221 is input to the depth error detection network 210 for a preset number of times repeatedly, the processor 120 may transfer, to the outputter 130, the enhanced depth information 221 output from the corrector 220 as depth information in which the error is corrected.

The depth error detection network 210 may include a first encoder configured to encode the depth information 201 and outputs a feature of the depth information 201, a second encoder configured to encode the color image 202 and output a feature of the color image 202, and a decoder configured to output a result of diagnosing an error in the depth information 201 for each pixel in the color image 202 based on the feature of the color image 202 and the feature of the depth information 201.

The first encoder may be trained using cross modal distillation for a supervision transfer to output the feature of the depth information 201 having a format corresponding to a format of the feature of the color image 202.

The decoder may perform a convolution by concatenating the feature of the color image 202 and the feature of the depth information 201, concatenate information obtained through the convolution and information decoded in a previous step, process the concatenated information, and repeat such a process. The decode may then perform a convolution having a sigmoid activation and output the result of diagnosing the error in the depth information 201. When processing the concatenated information, the decoder may perform upsampling by interpolating the concatenated information, and perform a convolution on the upsampled information, perform batch normalization on information obtained through the convolution, and output a corresponding result.

In addition, the depth error detection network 210 may be trained using a loss function that includes a total number of pixels included in the color image 202, a probability that each of the pixels belongs to each class of the result of diagnosing the error in depth information (hereinafter simply a "depth information error diagnosis result") based on the output of the depth error detection network 210, and a probability that each of the pixels belongs to each class of the depth information error diagnosis result based on ground truth (or actual) information.

For example, the depth error detection network 210 may use the loss function represented by Equation 1 below.

$$L = -\frac{1}{N}\sum_{i=1}^{N}\sum_{j=1}^{3} y_{i,j} \log(\bar{y}_{i,j}) \quad \text{[Equation 1]}$$

In Equation 1, N denotes the number of pixels included in the color image 202, $y_{i,j}$ denotes a probability of an ith pixel belonging to a j class based on an output of the depth error detection network 210. The j class may be one of over-estimated depth information, under-estimated depth information, and correctly estimated depth information corresponding to an actual depth.

Figure 3:
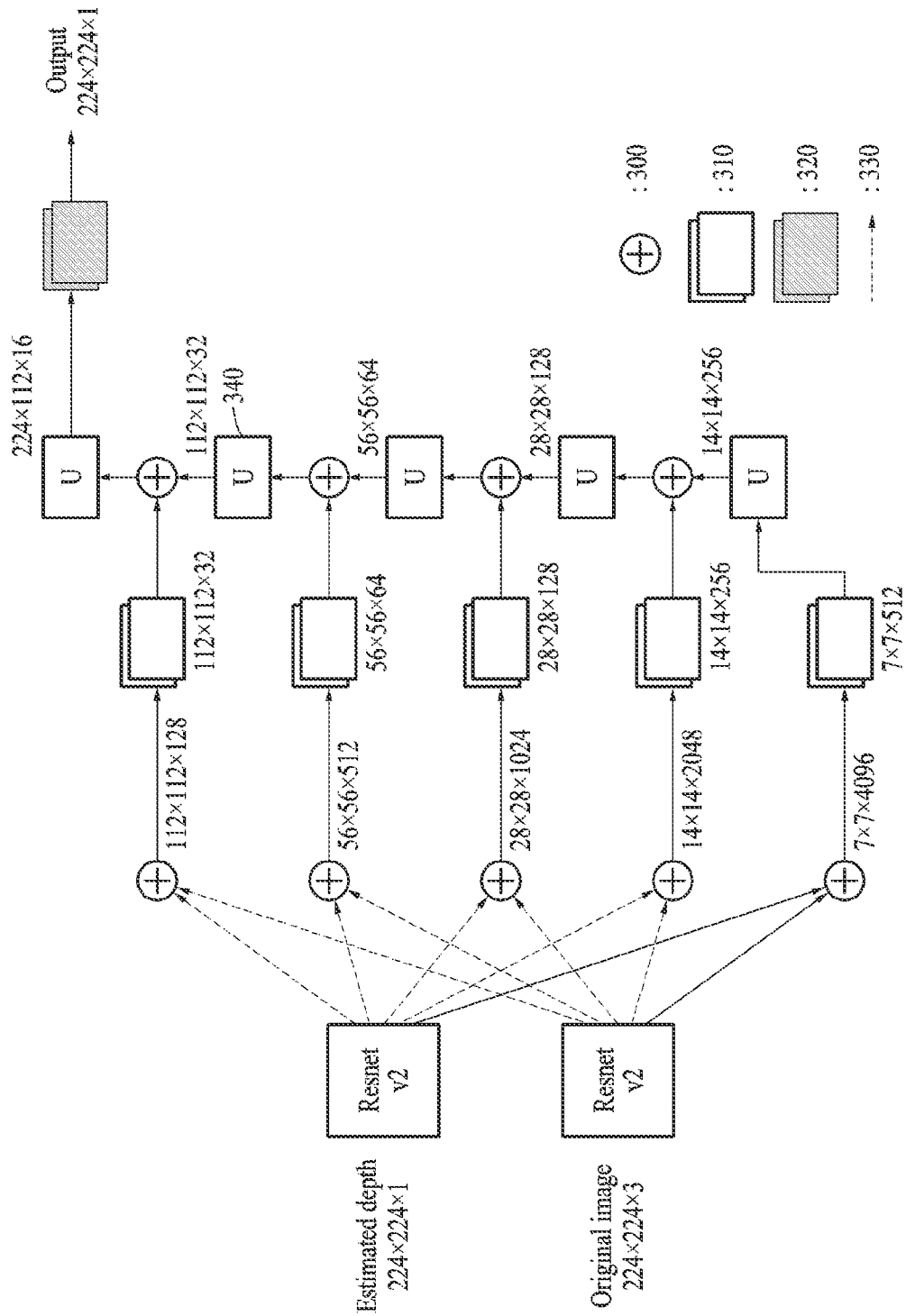
FIG. 3 is a diagram illustrating an example of a single image-based depth error detection network according to an example embodiment.

FIG. 3 is a diagram illustrating an example of a single image-based depth error detection network according to an example embodiment.

A first encoder 301 may encode estimated depth information to output a feature of depth information. The first encoder 310 may be a Resnet V2, for example. In addition, the first encoder 301 may be additionally trained in advance using cross modal distillation for a supervision transfer, and thus output the feature of the depth information having a format corresponding to a format of a feature of a color image.

A second encoder 302 may encode the color image (or an original image) to output the feature of the color image. The second encoder 302 may be a Resnet V2, for example.

As illustrated in FIG. 3, a decoder includes skip connections 330 for training based on features in a previous step, concatenations 300 for concatenating the feature of the color image and the feature of the depth information, convolutions 310 for performing convolution operations on the concatenated features in each step, units U 340 for concatenating information obtained through the convolutions with information decoded in a previous step and processing the concatenated information, and a convolution 320 for performing a convolution operation before a final output.

The convolutions 310 may be two-dimensional (2D) 3×3 convolutions using a leaky rectified linear unit (ReLU), and the convolution 320 may be a 2D 3×3 convolution using sigmoid.

In addition, the decoder may perform a convolution by concatenating the feature of the color image and the feature of the depth information, repeat such a process, and perform a convolution having a sigmoid activation in a final step, to output a result of diagnosing an error in the depth information.

Figure 4:
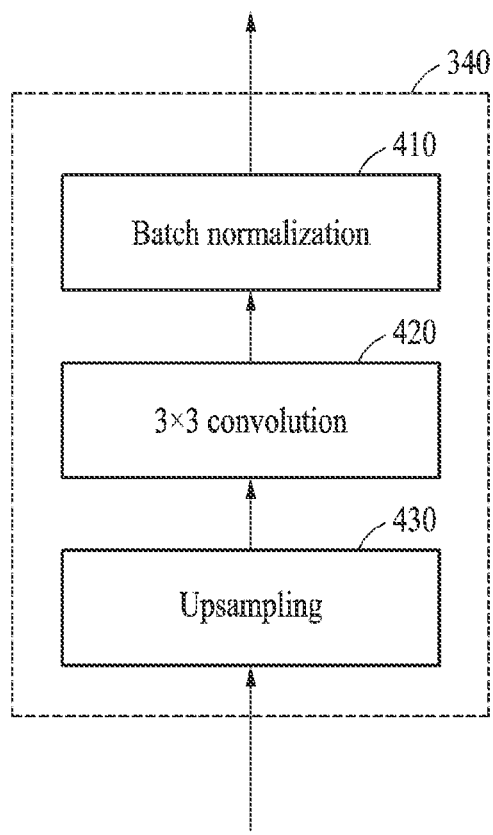
FIG. 4 is a diagram illustrating an example of an operation of a unit U illustrated in FIG. 3.

FIG. 4 is a diagram illustrating an example of an operation of a unit U 340 illustrated in FIG. 3.

Referring to FIG. 4, a unit U 340 may perform upsampling 430 by interpolating concatenated information, perform a convolution 420 on the upsampled information, and perform batch normalization 410 on information obtained through the convolution 420. For example, the unit U 340 may perform the upsampling 430 by interpolating information using a closest neighboring pixel. For example, the unit U 340 may perform a 2D 3×3 convolution on the upsampled information using a leaky ReLU.

Figure 5:
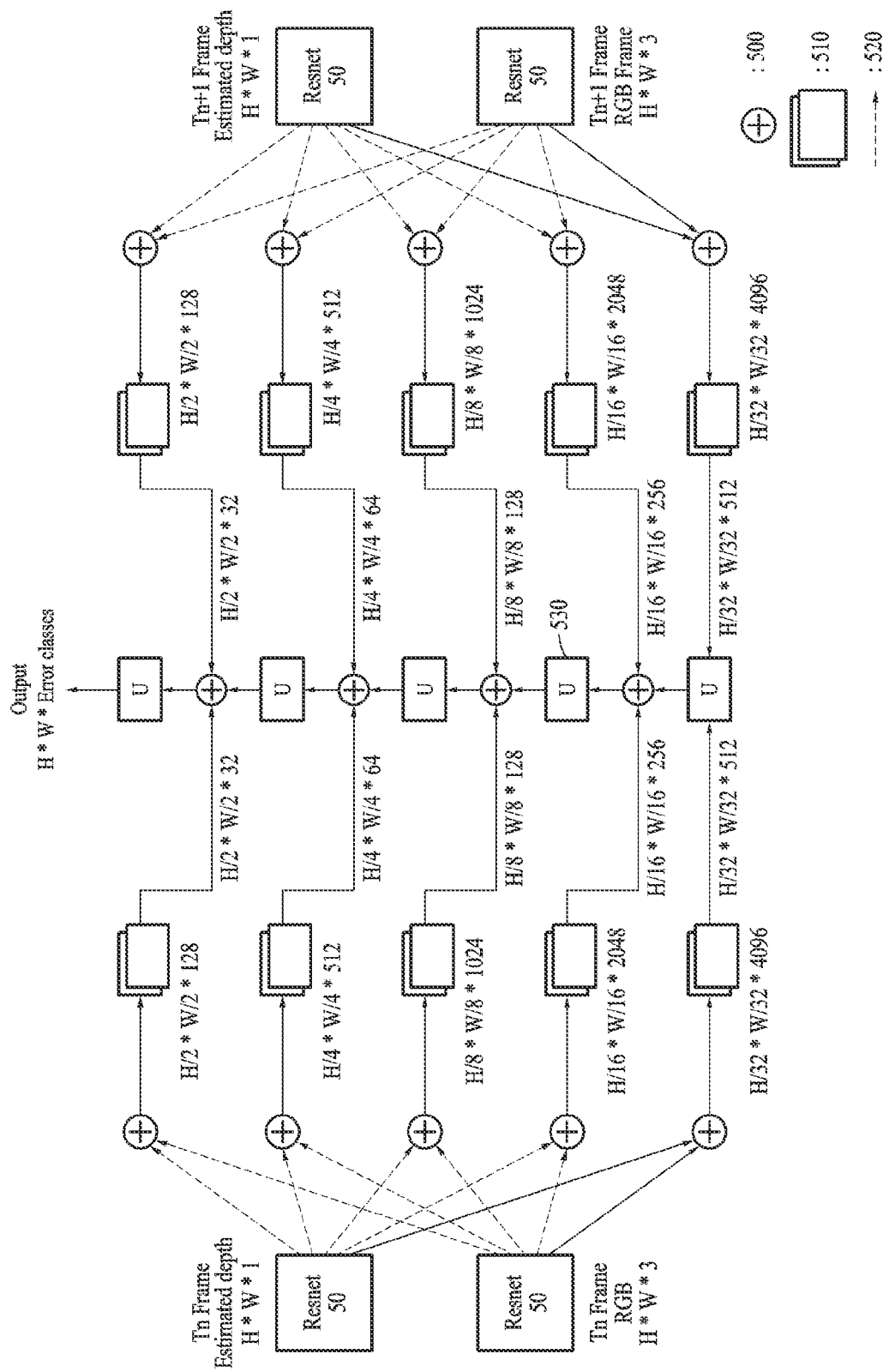
FIG. 5 is a diagram illustrating an example of a multiple image-based depth error detection network according to an example embodiment.

FIG. 5 is a diagram illustrating an example of a multiple image-based depth error detection network according to an example embodiment.

Referring to FIG. 5, a multiple image-based depth error detection network may encode color images and each set of depth information estimated from each of the color images and input a result obtained from the encoding to units U 530 to detect a depth error.

For example, as illustrated, a first encoder 501 may encode estimated Tn frame depth information that is estimated from a color image of a Tn frame to output a feature of depth information. The first encoder 501 may be a Resnet 50, for example.

A second encoder 502 may encode an original Tn frame image which is the color image of the Tn frame to output a feature of the color image. The second encoder 502 may be a Resnet 50, for example.

A third encoder 503 may encode estimated Tn+1 frame depth information that is estimated from a color image of a Tn+1 frame to output a feature of depth information. The third encoder 503 may be a Resnet 50, for example. In addition, the first encoder 501 and the third encoder 503 may be additionally trained in advance using cross modal distillation for a supervision transfer and output a feature of depth information having a format corresponding to a format of a feature of a color image.

A fourth encoder 504 may encode an original Tn+1 frame image which is the color image of the Tn+1 frame to output a feature of the color image. The fourth encoder 504 may be a Resnet 50, for example.

In this example, concatenations 500 of a decoder may concatenate the feature of the color image output from the first encoder 501 and the feature of the depth information output from the second encoder 502, and input a result of the concatenating to convolutions 510. In addition, the concatenations 500 of the decoder may concatenate the feature of the color image output from the third encoder 503 and the feature of the depth information output from the fourth encoder 504, and input a result of the concatenating to the convolutions 510.

The convolution 510 may then perform convolution operations on the concatenated features and input a result of the convolution operations to units U 530. The units U 530 may receive an output of the units U 530 in a previous step and outputs of the convolutions 510 to perform operations. The operations of the units U 530 will be described in detail with reference to FIG. 6.

In addition, the first encoder 501 and the third encoder 503 may output the features of the depth information to the concatenations 500 in a next step through skip connections 520 for training based on a feature in a previous step. Also, the second encoder 502 and the fourth encoder 504 may output the features of the color images to the concatenators 500 in the next step through the skip connectors 520.

Figure 6:
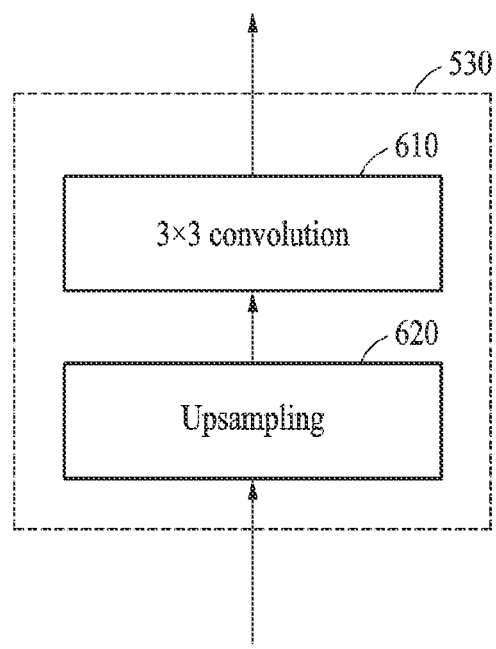
FIG. 6 is a diagram illustrating an example of an operation of a unit U illustrated in FIG. 5.

FIG. 6 is a diagram illustrating an example of an operation of a unit U 530 illustrated in FIG. 5.

Referring to FIG. 6, a unit U 530 may perform upsampling 620 by interpolating concatenated information, and perform a convolution 610 on the upsampled information, to output a corresponding result. The unit U 530 may perform the upsampling 620 by interpolating the information using a closest neighboring pixel. In addition, the unit U 530 may perform a 2D 3×3 convolution using a leaky ReLU on the upsampled information.

Figure 7:
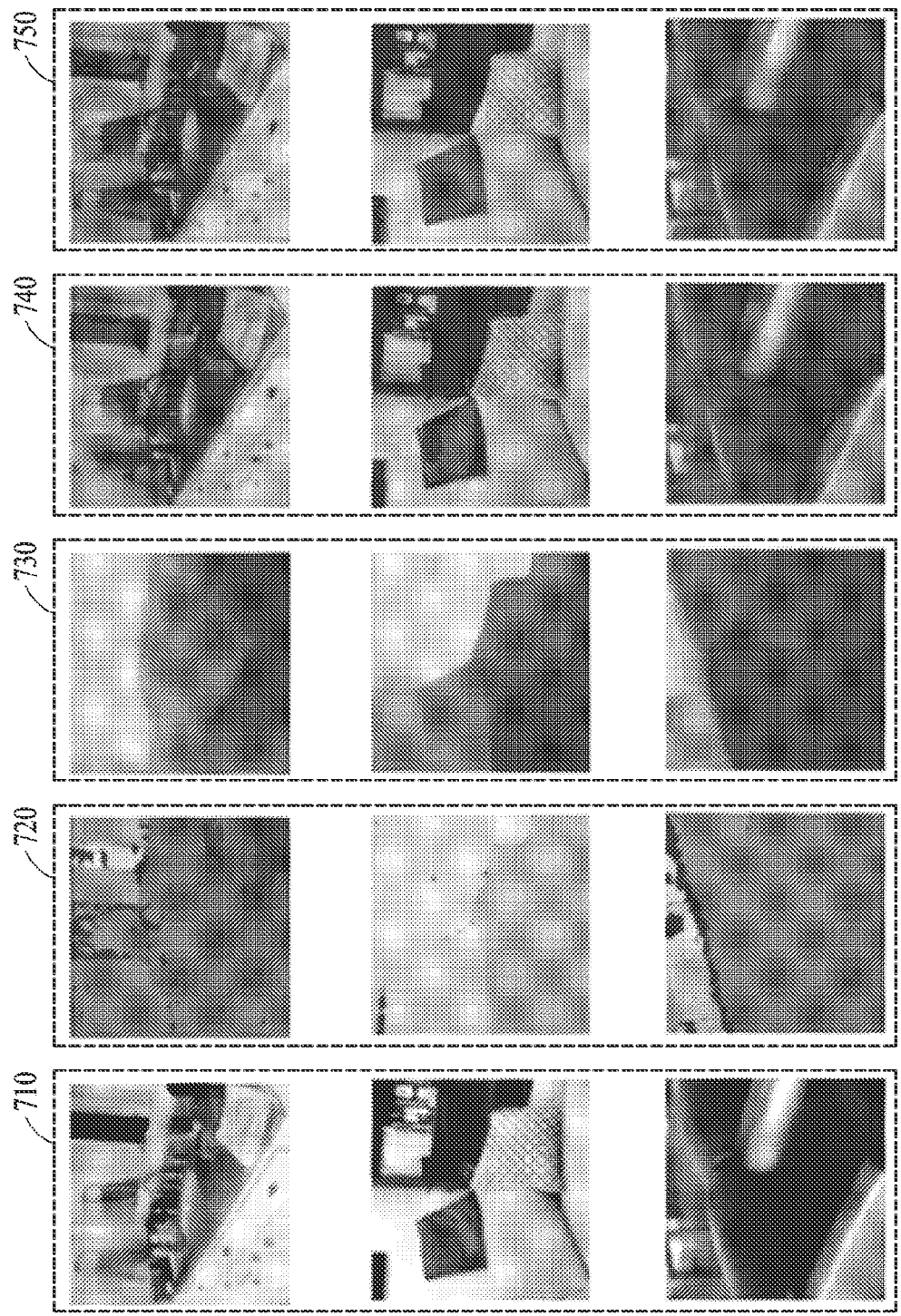
FIG. 7 illustrates an example of a result of detecting an error in depth information according to an example embodiment.

FIG. 7 illustrates an example of a result of detecting an error in depth information according to an example embodiment.

Referring to FIG. 7, respective rows from top to bottom indicate results of detecting an error in depth information using depth information estimated based on an eigen-based deep learning model, a BTS (From Big to Small)-based deep learning model, and a plane-RCNN (Regions with Convolutional Neural Network) based deep learning model.

In FIG. 7, 710 indicates color images input to the depth error detection network 210, 720 indicates ground truth information respectively corresponding to the color images. In addition, 730 indicates depth information estimated from the eigen-based deep learning model, the BTS-based deep learning model, and the plane-RCNN deep learning model. In addition, 740 indicates an error in the depth information output from the depth error detection network 210, and 750 indicates an actual error in the depth information identified by comparing 720 and 730. Here, 740 indicates an area in which an error occurs using color. For example, an over-estimated area, an under-estimated area, and a correctly estimated area corresponding to an actual depth is indicated in different colors.

As described above, 740 indicates the error in the depth information estimated by the depth error detection network 210, and 750 indicates the actual error. Thus, an increase in similarity between 740 and 750 may indicate a higher level of error detecting performance of the depth error detection network 210.

For example, the depth error detection network 210 that receives depth information estimated based on a single image may output estimation results as indicated in Table 1 below.

TABLE 1

| Model | Under Precision | Over Precision | Under Recall | Over Recall |
| --- | --- | --- | --- | --- |
| Eigen [7] | 0.4959 | 0.4301 | 0.5608 | 0.5215 |
| BTS [9] | 0.1919 | 0.2431 | 0.0141 | 0.2925 |
| Plane-RCNN [10] | 0.5910 | 0.2290 | 0.5250 | 0.2760 |

Depth information corrected by the corrector 220 of the depth information error correcting apparatus 100 based on an output of the depth error detection network 210 may be as indicated in Table 2 below.

TABLE 2

| Model | | Metrics | | | | | | | | |
|---|---|---|---|---|---|---|---|---|---|---|
| | | Higher is better | | | Lower is better | | | | | |
| | | $\delta < 1.25$ | $\delta < 1.25^2$ | $\delta < 1.25^3$ | AbsRel | SqRel | RMSE | RMSElog | SBog | log 10 |
| Eigen | Before | 0.6095 | 0.8696 | 0.9448 | 4.1154 | 12.7965 | 0.8364 | 0.5831 | 54.9865 | 0.1233 |
| | After | 0.5725 | 0.8392 | 0.9319 | 3.8852 | 11.7373 | 0.8707 | 0.5897 | 55.9491 | 0.1310 |
| | After 2 | 0.6081 | 0.8698 | 0.9451 | 4.0845 | 12.6479 | 0.8354 | 0.5822 | 54.9469 | 0.1232 |
| BTS | Before | 0.8958 | 0.9830 | 0.9965 | 0.1071 | 0.0678 | 0.3853 | 0.1286 | 8.9414 | 0.0454 |
| | After | 0.8916 | 0.9817 | 0.9961 | 0.1087 | 0.0696 | 0.3989 | 0.1330 | 9.2539 | 0.0472 |
| PlaneRCNN | Before | 0.8560 | 0.9776 | 0.9917 | 0.1260 | 0.0496 | 0.2522 | 0.1436 | 7.6612 | 0.0544 |
| | After | 0.8655 | 0.9740 | 0.9916 | 0.1233 | 0.0495 | 0.2403 | 0.1386 | 7.5350 | 0.0523 |

In addition, the depth error detection network 210 that receives depth information estimated based on a plurality of images may output estimation results as indicated in Table 3 below.

TABLE 3

| Model | Under Precision | Over Precision | Under Recall | Over Recall |
|---|---|---|---|---|
| Eigen [7] | 0.8862 | 0.8246 | 0.9292 | 0.7235 |
| BTS [9] | 0.5235 | 0.6934 | 0.1484 | 0.7177 |
| Plane-RCNN [10] | 0.6824 | 0.5538 | 0.8509 | 0.3794 |

Depth information corrected by the corrector 220 of the depth information error correcting apparatus 100 based on an output of the depth error detection network 210 may be as indicated in Table 4 below.

TABLE 4

| Model | | Metrics | | | | | | | | |
|---|---|---|---|---|---|---|---|---|---|---|
| | | Higher is better | | | Lower is better | | | | | |
| | | $\delta < 1.25$ | $\delta < 1.25^2$ | $\delta < 1.25^3$ | AbsRel | SqRel | RMSE | RMSElog | SBog | log 10 |
| Eigen | Before | 0.4109 | 0.7177 | 0.8876 | 0.3518 | 0.4715 | 1.0646 | 0.3999 | 32.9845 | 0.1447 |
| | After | 0.4329 | 0.7313 | 0.8923 | 0.3706 | 0.5114 | 1.0568 | 0.3925 | 32.4454 | 0.1410 |
| BTS | Before | 0.8882 | 0.9793 | 0.9950 | 0.1087 | 0.0639 | 0.3852 | 0.1405 | 11.4799 | 0.0462 |
| | After | 0.8750 | 0.9771 | 0.9946 | 0.1151 | 0.0672 | 0.4076 | 0.1508 | 11.5759 | 0.0513 |
| PlaneRCNN | Before | 0.8477 | 0.9716 | 0.9940 | 0.1208 | 0.0552 | 0.3319 | 0.1573 | 12.3549 | 0.0539 |
| | After | 0.8645 | 0.9730 | 0.9933 | 0.1191 | 0.0528 | 0.3035 | 0.1495 | 12.7273 | 0.0497 |

Figure 8:
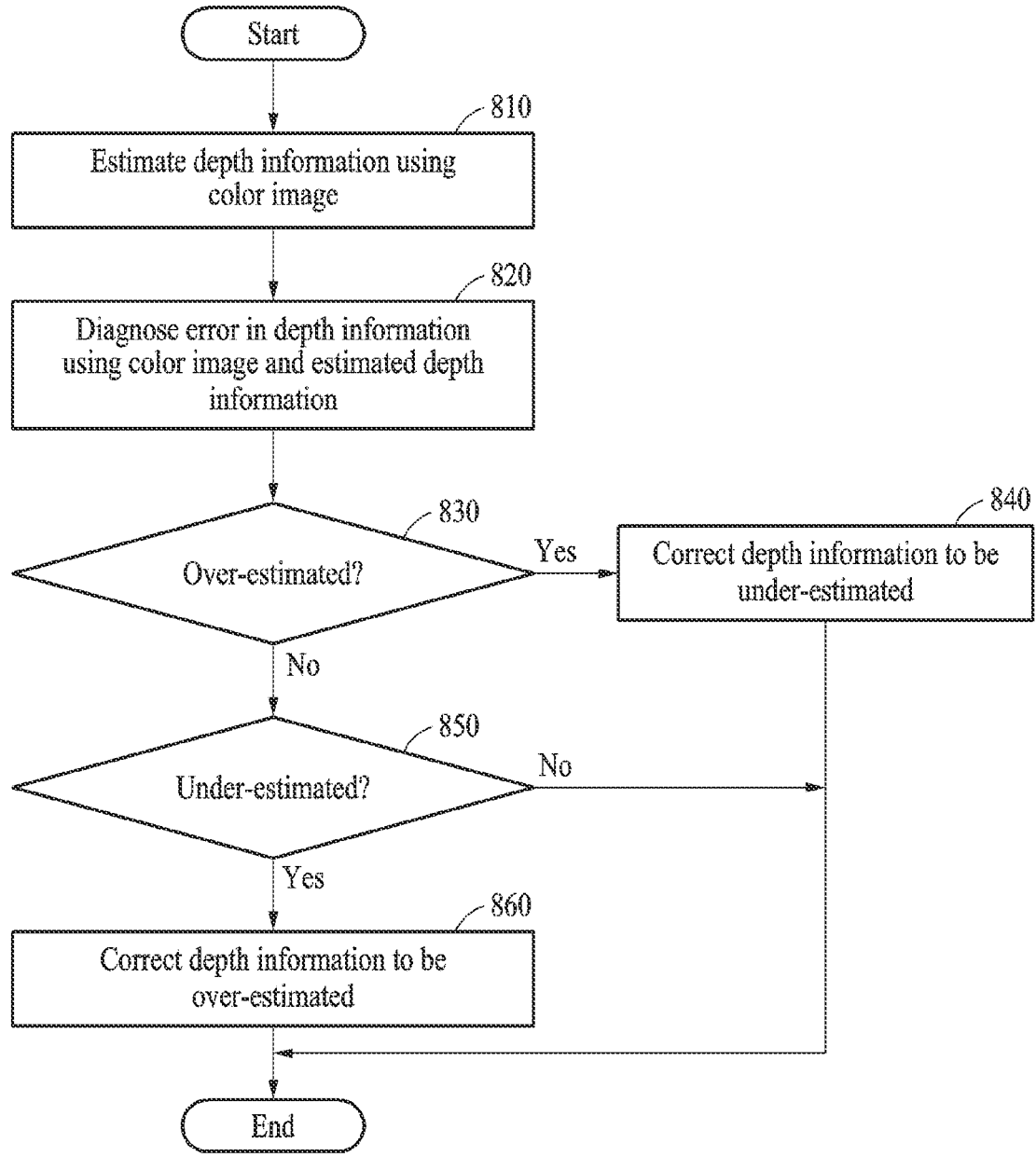
FIG. 8 is a flowchart illustrating an example of a method of correcting an error in depth information according to an example embodiment.

FIG. 8 is a flowchart illustrating an example of a method of correcting an error in depth information according to an example embodiment.

In operation 810, the processor 120 estimates depth information from a color image. Operation 810 may be performed only when the processor 120 estimates the depth information, and be omitted when the inputter 110 receives estimated depth information as an input.

In operation 820, the processor 120 diagnoses an error in the depth information by inputting the color image and the depth information estimated using the color image to a depth error detection network. The depth error detection network may output, as a depth information error diagnosis result, an estimation result obtained as one of "over-estimated depth information," "under-estimated depth information," "correctly estimated depth information corresponding to an actual depth." for each pixel of the color image based on the color image and the estimated depth information.

In operation 830, the processor 120 verifies whether the output of the depth error detection network 210 corresponds to the over-estimated depth information. When the output of the depth error detection network 210 corresponds to the over-estimated depth information, the processor 120 performs operation 840. However, when the output of the depth error detection network 210 does not correspond to the over-estimated depth information, the processor 120 performs operation 850.

In operation 840, the corrector 220 of the processor 120 corrects the estimated depth information through under-estimation and determines enhanced depth information.

In operation 850, the processor 120 verifies whether the output of the depth error detection network 210 corresponds to the under-estimated depth information. When the output of the depth error detection network 210 corresponds to the under-estimated depth information, the processor 120 performs operation 860. However, when the output of the depth error detection network 210 does not correspond to the under-estimated depth information, the corrector 220 of the processor 120 determines the depth information as the enhanced depth information without a correction.

In operation 860, the corrector 220 of the processor 120 corrects the depth information through over-estimation and determines the enhanced depth information.

A depth information error correcting apparatus or a depth information error correcting method described herein may be written in a program that is executable in a computer and be embodied in various recording media, such as, for example, a magnetic storage medium, an optical reading medium, and a digital storage medium.

According to an example embodiment, it is possible to improve the accuracy of estimated depth information by diagnosing an error in estimated depth information using a depth error detection network and correcting the depth information based on a result of the diagnosing.

According to an example embodiment, it is possible to improve the accuracy of depth information by repeating a process of correcting depth information, diagnosing again an error in the depth information using the corrected depth information and a color image and correcting the depth information based on the diagnosed error.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums. The non-transitory computer readable recording medium may include any data storage device that can store data which can be thereafter read by a computer system or processing device.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A method of correcting an error in depth information, comprising:
    diagnosing an error in depth information by inputting depth information estimated using a color image and the color image to a depth error detection network; and
    determining enhanced depth information by maintaining or correcting the depth information based on the diagnosed error,
    wherein the depth error detection network is configured to:
        receive, as an input, the depth information or the enhanced depth information, and the color image, and output, as a result of diagnosing the error in the depth information, one of over-estimated depth information, under-estimated depth information, and correctly estimated depth information corresponding to an actual depth, for each pixel of the color image, and
    wherein, when the output of the depth error detection network corresponds to the over-estimated depth information, the determining of the enhanced depth information comprises:
        determining the enhanced depth information by decrementing the depth information.

2. The method of claim 1, wherein the diagnosing comprises:
    diagnosing an error in the enhanced depth information using the enhanced depth information and the color image, after the enhanced depth information is determined.

3. The method of claim 1, wherein the depth error detection network comprises:
    a first encoder configured to encode the depth information and output a feature of the depth information, a second encoder configured to encode the color image and output a feature of the color image, and a decoder configured to output a result of diagnosing the error in the depth information for each pixel of the color image based on the feature of the color image and the feature of the depth information.

4. The method of claim 3, wherein the first encoder is configured to be trained using cross modal distillation for a supervision transfer to output the feature of the depth information having a format corresponding to a format of the feature of the color image.

5. The method of claim 3, wherein the decoder is configured to repeat a process of concatenating the feature of the color image and the feature of the depth information and performing a convolution, concatenating information obtained through the convolution and information decoded in a previous step, and processing the concatenated information, and perform a convolution having a sigmoid activation in a final step, to output the result of diagnosing the error in the depth information.

6. The method of claim 5, wherein the processing of the concatenated information comprises:
performing upsampling by interpolating the concatenated information, performing a convolution on the upsampled information, and performing batch normalization on information obtained through the convolution.

7. The method of claim 3, wherein the depth error detection network is configured to be trained using a loss function that includes a total number of pixels included in the color image, a probability of each of the pixels belonging to each class of the result of diagnosing the error in the depth information based on the output of the depth error detection network, and a probability of each of the pixels belonging to each class of the result of diagnosing the error in the depth information based on ground truth information.

8. A non-transitory computer-readable storage medium storing instructions that, when executed by a processor, cause the processor to perform the method of claim 1.

9. An apparatus for correcting an error in depth information, comprising:
a processor configured to diagnose an error in depth information by inputting depth information estimated using a color image and the color image to a depth error detection network, and determine enhanced depth information by maintaining or correcting the depth information based on the diagnosed error,
wherein the depth error detection network comprises:
a first encoder configured to encode the depth information and output a feature of the depth information, a second encoder configured to encode the color image and output a feature of the color image, and a decoder configured to output a result of diagnosing the error in the depth information for each pixel of the color image based on the feature of the color image and the feature of the depth information, and
wherein the depth error detection network is configured to be trained using a loss function that includes a total number of pixels included in the color image, a probability of each of the pixels belonging to each class of the result of diagnosing the error in the depth information based on the output of the depth error detection network, and a probability of each of the pixels belonging to each class of the result of diagnosing the error in the depth information based on ground truth information.

10. The apparatus of claim 9, wherein the processor is configured to:
diagnose an error in the enhanced depth information using the enhanced depth information and the color image, after the enhanced depth information is determined.

11. The apparatus of claim 9, wherein the first encoder is configured to be trained using cross modal distillation for a supervision transfer to output the feature of the depth information having a format corresponding to a format of the feature of the color image.

12. The apparatus of claim 9, wherein the decoder is configured to repeat a process of concatenating the feature of the color image and the feature of the depth information and performing a convolution, concatenating information obtained through the convolution with information decoded in a previous step, and processing the concatenated information, and perform a convolution having a sigmoid activation in a final step to output the result of diagnosing the error in the depth information.

13. The apparatus of claim 12, wherein the processing of the concatenated information comprises:
performing upsampling by interpolating the concatenated information, performing a convolution on upsampled information, and performing batch normalization on information obtained through the convolution.

14. A method of correcting an error in depth information, comprising:
diagnosing an error in depth information by inputting depth information estimated using a color image and the color image to a depth error detection network; and
determining enhanced depth information by maintaining or correcting the depth information based on the diagnosed error,
wherein the depth error detection network is configured to:
receive, as an input, the depth information or the enhanced depth information, and the color image, and output, as a result of diagnosing the error in the depth information, one of over-estimated depth information, under-estimated depth information, and correctly estimated depth information corresponding to an actual depth, for each pixel of the color image, and
wherein, when the output of the depth error detection network corresponds to the under-estimated depth information, the determining of the enhanced depth information comprises:
determining the enhanced depth information by incrementing the depth information.

* * * * *